Patented Feb. 16, 1932

1,845,390

UNITED STATES PATENT OFFICE

OTTO BAYER, OF FRANKFORT-ON-THE-MAIN, GERMANY, ASSIGNOR TO GENERAL ANILINE WORKS, INC., OF NEW YORK, N. Y., A CORPORATION OF DELAWARE

SULPHUR VAT DYESTUFFS

No Drawing. Application filed January 21, 1931, Serial No. 510,333, and in Germany January 28, 1930.

The present invention relates to the production of sulphur vat dyestuffs of the anthraquinone series.

I have found that sulphur vat dyestuffs of the anthraquinone series which are probably dithiazoles are obtained by heating an imide-chloride of a di-2'-anthraquinonoyl-para-diaminoaryl with a sulphurizing agent. Sulphurization is preferably carried out in an inert organic solvent, such as for example naphthalene. The products are identical with the vat dyestuffs obtainable according to the U. S. Patent No. 1,440,833. Contrasted with the process of the said patent, the process according to the present invention has the advantage that the dyestuffs are obtained directly in a pure form. Moreover according to the present invention, substitution products may be prepared which would undergo change by the sulphur fusion according to the said patent.

The following examples will further illustrate how this invention may be carried out in practice, but the invention is not restricted to these examples.

Example 1

(a) 4.7 kilograms of benzidine are dissolved in about 100 kilograms of hot trichlorbenzene and stirred into a solution of 14 kilograms of anthraquinone-2-carboxylic acid chloride in 150 kilograms of trichlorbenzene at 200° C. The diamide separates out immediately in the form of a golden yellow precipitate with the evolution of hydrogen chloride. After stirring for about half an hour under a reflux condenser the reaction mixture is filtered by suction, the filter cake washed with benzene and dried. The yield is practically theoretical.

(b) 15 kilograms of this N.N'-di-2'-anthraquinonoyl-benzidine are boiled for from 1 to 2 hours under a reflux condenser with 20 kilograms of phosphorus pentachloride in about 300 kilograms of ortho-dichlorbenzene, and temporary solution takes place. On cooling, the imide-chloride separates out in the form of orange crystals having a melting point of about 322° C. The yield is excellent.

(c) A mixture of 500 kilograms of naphthalene and 60 kilograms of sulphur is heated to about 220° C. and 40 kilograms of the imide-chloride are stirred in. After carrying on the reaction for about 10 hours the formation of the dyestuff is completed. After cooling to 100° C. the melt is diluted with chlorbenzene and the dyestuff is filtered off by suction and washed with ethyl alcohol. It is thus directly obtained in a pure form. It dyes cotton from a brown olive vat powerful golden yellow shades having excellent properties as regards fastness.

By this method it is not essential to separate and isolate the intermediate products. The formation of the anthraquinone-2-carboxylic acid chloride, of the diamide, of the imide-chloride and the sulphurization may be carried out in a single operation.

Example 2

By replacing the benzidine in Example 1 by the equivalent amount of para-phenylenediamine, a dyestuff is obtained which corresponds to that obtained according to Example 2 of the U. S. Patent No. 1,440,833 from 2-methylanthraquinone and para-phenylenediamine.

Similar dyestuffs are obtained by employing the derivatives of anthraquinone-2-carboxylic acid chloride, as for example chloro-, methoxy- or 1-amino-anthraquinone-2-carboxylic acid halides, instead of anthraquinone-2-carboxylic acid chloride in the process hereinbefore described.

What I claim is:

1. A process for the manufacture of sulphur vat dyestuffs of the anthraquinone series, which comprises heating an imide-chloride of di-2'-anthraquinonoyl-para-diaminoaryl with a sulphurizing agent.

2. A process for the manufacture of sulphur vat dyestuffs of the anthraquinone series, which comprises heating an imide-chloride of di-2'-anthraquinonoyl-para-diaminoaryl with a sulphurizing agent in an inert organic solvent.

3. A process for the manufacture of sulphur vat dyestuffs of the anthraquinone series, which comprises heating an imide-chloride of di-2'-anthraquinonoyl-para-diaminoaryl in naphthalene with sulphur.

4. A process for the manufacture of a sulphur vat dyestuff of the anthraquinone series, which comprises heating the imide-chloride of N.N'-di-2'-anthraquinonoyl-benzidine in naphthalene with sulphur.

5. A process for the manufacture of a sulphur vat dyestuff of the anthraquinone series, which comprises heating the imide-chloride of N.N'-di-2'-anthraquinonoyl-paraphenylene-diimine in naphthalene with sulphur.

In testimony whereof I have hereunto set my hand.

OTTO BAYER.